US009090723B2

(12) United States Patent
Zhang et al.

(10) Patent No.: US 9,090,723 B2
(45) Date of Patent: *Jul. 28, 2015

(54) HIGH EXCHANGE CAPACITY PERFLUORINATED ION EXCHANGE RESIN, PREPARATION METHOD AND USE THEREOF

(75) Inventors: Yongming Zhang, Zibo (CN); Heng Zhang, Zibo (CN); Sheng Qin, Zibo (CN); Zihong Gao, Zibo (CN); Li Wang, Zibo (CN); Yong Li, Zibo (CN); Xuezhang Song, Zibo (CN)

(73) Assignee: Shandong Huaxia Shenzou New Material Co., Ltd., Shandong (CN)

( * ) Notice: Subject to any disclaimer, the term of this patent is extended or adjusted under 35 U.S.C. 154(b) by 256 days.

This patent is subject to a terminal disclaimer.

(21) Appl. No.: 13/516,691

(22) PCT Filed: Dec. 15, 2009

(86) PCT No.: PCT/CN2009/001457
§ 371 (c)(1),
(2), (4) Date: Jul. 20, 2012

(87) PCT Pub. No.: WO2011/072418
PCT Pub. Date: Jun. 23, 2011

(65) Prior Publication Data
US 2012/0282541 A1 Nov. 8, 2012

(51) Int. Cl.
*H01M 8/10* (2006.01)
*C08F 214/26* (2006.01)
(Continued)

(52) U.S. Cl.
CPC ............ *C08F 214/265* (2013.01); *C08F 214/26* (2013.01); *C08F 214/262* (2013.01);
(Continued)

(58) Field of Classification Search
CPC ............ H01M 8/1023; H01M 8/1039; H01M 2008/1095; C08F 214/26; C08F 214/262; C08F 214/265; C08F 214/267; C08J 5/2243
USPC ........ 429/494, 492, 493; 204/252; 521/27, 38
See application file for complete search history.

(56) References Cited

U.S. PATENT DOCUMENTS 2,393,967 A 2/1946 Brubaker
3,041,317 A 6/1962 Gibbs et al.
(Continued)

FOREIGN PATENT DOCUMENTS

CN 1147567 A 4/1997
CN 1882642 12/2006
(Continued)

OTHER PUBLICATIONS

International Search Report, dated Sep. 23, 2010 for PCT Application No. PCT/CN2009/001457, 4 pages.
(Continued)

*Primary Examiner* — Sean P Cullen
(74) *Attorney, Agent, or Firm* — Christie, Parker & Hale, LLP (57) ABSTRACT

The present invention provides a high exchange capacity perfluorinated resin comprising two kinds of sulfonyl fluoride-containing short pendant groups of different structures, which is prepared by copolymerizing tetrafluoroethylene, vinyl ether monomers comprising two kinds of sulfonyl fluoride-containing short pendant groups of different structures, and vinyl ether monomer comprising bromine-containing pendant group, wherein based on all monomer units in the copolymer, the mol % of tetrafluoroethylene monomer is 50-85%, the mol % of vinyl ether monomers comprising two kinds of sulfonyl fluoride-containing short pendant groups of different structures is 5-49% and the mol % of vinyl ether monomer comprising bromine-containing pendant group is 1-10%. Perfluorinated ion exchanges membrane prepared from such perfluorinated resin have resistance to various chemical media, high ion exchange capacity, high conductivity, high mechanical strength, high size stability, low membrane electrical resistance and long service life, and may be applied in fuel cells or high-temperature fuel cells.

20 Claims, 4 Drawing Sheets

(51) Int. Cl.
*C25B 13/08* (2006.01)
*C08J 5/22* (2006.01)

(52) U.S. Cl.
CPC ........... *C08F214/267* (2013.01); *C08J 5/2243* (2013.01); *H01M 8/1023* (2013.01); *H01M 8/1039* (2013.01); *C08J 2327/12* (2013.01); *H01M 2008/1095* (2013.01); *Y02E 60/522* (2013.01)

(56) References Cited

U.S. PATENT DOCUMENTS

| | | | |
|---|---|---|---|
| 3,282,875 | A | 11/1966 | Connolly et al. |
| 3,560,568 | A | 2/1971 | Resnick |
| 3,884,885 | A | 5/1975 | Grot |
| 4,358,545 | A | 11/1982 | Ezzell et al. |
| 4,417,969 | A | 11/1983 | Ezzell et al. |
| 4,453,991 | A | 6/1984 | Grot |
| 4,661,411 | A | 4/1987 | Martin et al. |
| 4,789,717 | A | 12/1988 | Giannetti et al. |
| 4,864,006 | A | 9/1989 | Giannetti et al. |
| 4,940,525 | A | 7/1990 | Ezzell et al. |
| 5,082,472 | A | 1/1992 | Mallouk et al. |
| 5,246,792 | A | 9/1993 | Watanabe |
| 5,608,022 | A | 3/1997 | Nakayama et al. |
| 5,654,109 | A | 8/1997 | Plowman et al. |
| 5,716,504 | A | 2/1998 | Saito et al. |
| 5,718,947 | A | 2/1998 | Martin et al. |
| 5,981,097 | A | 11/1999 | Rajendran |
| 6,624,328 | B1 | 9/2003 | Guerra |
| 6,639,011 | B2 | 10/2003 | Arcella et al. |
| 6,680,346 | B1 | 1/2004 | Kimoto |
| 6,767,977 | B2 | 7/2004 | Arcella et al. |
| 6,861,489 | B2 | 3/2005 | Wu et al. |
| 7,022,428 | B2 | 4/2006 | Wu et al. |
| 7,041,409 | B2 | 5/2006 | Wu et al. |
| 2002/0014405 | A1 | 2/2002 | Arcella et al. |
| 2004/0092611 | A1 | 5/2004 | Nishio et al. |
| 2005/0107490 | A1* | 5/2005 | Yandrasits et al. ............ 522/156 |
| 2009/0227749 | A1 | 9/2009 | Tayanagi et al. |
| 2012/0237851 | A1* | 9/2012 | Zhang et al. .................. 429/494 |

FOREIGN PATENT DOCUMENTS

| | | |
|---|---|---|
| CN | 1882643 | 12/2006 |
| CN | 101220120 A | 7/2008 |
| CN | 101696178 A | 4/2010 |
| CN | 101698654 A | 4/2010 |
| CN | 101709101 A | 5/2010 |
| CN | 101712639 A | 5/2010 |
| EP | 0 028 969 B1 | 5/1981 |
| EP | 0 031 724 A2 | 7/1981 |
| EP | 0 194 862 A2 | 9/1986 |
| EP | 0 380 129 A1 | 8/1990 |
| EP | 1 091 435 A1 | 4/2001 |
| EP | 1 172 382 A2 | 1/2002 |
| EP | 1 451 233 A1 | 9/2004 |
| GB | 1034197 | 6/1966 |
| JP | 2006-083342 A | 3/2006 |
| WO | WO 03/050151 A1 | 6/2003 |
| WO | WO 2004-007576 A1 | 1/2004 |
| WO | WO 2008-046816 A1 | 4/2008 |
| WO | WO 2009/014930 A1 | 1/2009 |

OTHER PUBLICATIONS

International Search Report dated Sep. 16, 2010, for priority application PCT/CN2009/001432, 6 pages.

Non-Final Office action for U.S. Appl. No. 13/514,954, mailed Apr. 28, 2014, 6 pages.

Final Office action for U.S. Appl. No. 13/514,954, mailed Aug. 15, 2014, 9 pages.

U.S. Appl. No. 13/514,954 entitled: Perfluorinated Ion Exchange Resin, Preparation Method and Use Thereof, filed Jun. 8, 2012, file history, 340 pgs.

* cited by examiner

HIGH EXCHANGE CAPACITY PERFLUORINATED ION EXCHANGE RESIN, PREPARATION METHOD AND USE THEREOF

CROSS-REFERENCE TO RELATED APPLICATION(S)

This application is a National Phase Patent Application and claims priority to and benefit of International Application Number PCT/CN2009/001457, filed on Dec. 15, 2009, the entire disclosure of which is incorporated herein by reference.

TECHNICAL FIELD

The present invention belongs to the field of polymer materials comprising fluorine and relates to a high exchange capacity perfluorinated ion exchange resin, preparation method and use thereof, particularly relates to a multivariate copolymerized perfluorinated ion exchange resin, preparation method and use thereof.

BACKGROUND TECHNOLOGIES

Since the 1970s when DuPont processed perfluorinated sulfonic acid resin into perfluorinated sulfonic acid ion exchange membrane and also applied such membrane in chlor-alkali industry and proton exchange membrane fuel cells, perfluorinated sulfonic acid ion exchange resin has been investigated extensively worldwide.

Fluoride-containing ion exchange membrane containing ion exchange groups, especially sulfonic acid groups and carboxylic acid groups, is a more suitable ion exchange membrane which can be used in fuel cells and chlor-alkali electrolytic cells due to its resistance to chemical degradation. U.S. Pat. No. 3,282,875 is the first document disclosed by DuPont on synthesis of sulfonyl fluoride-containing monomer and preparation of sulfonic acid resin, wherein emulsion polymerization in aqueous system was conducted; and functional monomer containing sulfonyl fluoride pendant group has the formula: $FO_2SCF_2CF_2OCF(CF_3)CF_2OCF=CF_2$ which is utilized widely nowadays. U.S. Pat. No. 3,560,568 is a patent disclosed by DuPont relating to sulfonyl fluoride short pendant group-containing monomer, preparation of sulfonic acid resin and properties thereof, wherein sulfonyl fluoride-containing monomer has the formula: $FO_2SCF_2CF_2OCF=CF_2$. However, procedures of the preparation method are complicated but with low yield. U.S. Pat. No. 3,884,885 and U.S. Pat. No. 3,041,317 described a sulfonic acid resin prepared from perfluorinated sulfonyl fluoride monomers of a new structural formula which is $R_fCF=CFSO_2F$. Such monomer has low reaction activity. U.S. Pat. No. 4,358,545 and U.S. Pat. No. 4,417,969 are patents disclosed by The Dow Chemical Company and mainly relate to properties and use of copolymers prepared by copolymerization of short pendant group monomers $(CF_2=CFOCF_2CF_2SO_2F)$ and fluorine-containing vinyl monomers such as tetrafluoroethylene. It is very difficult to use the sulfonic acid resin obtained in accordance with this method to prepare thin films by solution coating, and the films obtained does not have sufficient mechanical strength, as U.S. Pat. No. 4,661,411 and U.S. Pat. No. 5,718,647 described. U.S. Pat. No. 4,940,525 discloses a method for preparing copolymer resin from vinylidene fluoride monomer and sulfonyl fluoride short pendant group-containing monomer, wherein said copolymer resin loses perfluorination structure and thereby has poor resistance to corrosion. EP 028969 discloses preparation of a sulfonic acid resin of low EW value, wherein the sulfonyl fluoride monomer used has the monomer structure which is generally adopted nowadays and its EW value is between 575 and 800. EP1451233 reports a method to prepare resin of low EW value by mini-emulsion polymerization. U.S. Pat. No. 7,022,428, U.S. Pat. No. 7,041,409 and U.S. Pat. No. 6,861,489 reports that low-EW value resin is prepared by adopting mini-emulsion polymerization and introducing divinylether-containing monomers during polymerization, wherein the formula of the divinylether-containing monomer is $CF_2=CF-O-CF_2CF_2CF_2-OCF=CF_2$ and its EW value is between 625 and 850. GB1034197 discloses perfluorinated sulfonic acid polymer containing sulfonic acid groups and EP1091435 discloses a structure of block sulfonic acid resin, wherein two said polymers are prepared by copolymerization of tetrafluoroethylene monomer and sulfonyl fluoride pendant group-containing vinyl ether monomers (e.g. $CF_2=CFOCF_2CF(CF_3)OCF_2CF_2SO_2F$), or further introduction of other monomer components containing double bonds but without functional ion exchange pendant groups (e.g. U.S. Pat. No. 4,940,525) into the above-mentioned polymerization system. Polymerization methods include solution polymerization (U.S. Pat. No. 2,393,967, U.S. Pat. No. 3,041,317 and etc.), emulsion polymerization (U.S. Pat. No. 4,789,717, U.S. Pat. No. 4,864,006 and etc.), micro-emulsion polymerization (e.g., U.S. Pat. No. 6,639,011, EP 1172382, U.S. Pat. No. 5,608,022 and etc.), dispersion polymerization, suspension polymerization, mini-emulsion polymerization (EP 1451233) and the like. After obtaining free sulfonic acid group by appropriate hydrolysis of sulfonyl fluoride, these polymers containing sulfonyl fluoride pendant group can function as ion exchange membrane to be applied in the fields of fuel cells, electrolytic cells, diffusion dialysis, catalysis, noble metals recovery and the like.

One of the foremost uses of perfluorinated sulfonic acid resin is to function as membrane material which can be applied in fuel cells. A key requirement for this kind of ion exchange membrane is its ionic conductivity. To increase conductivity, a normal practice known in the art is to increase ion exchange capacity of sulfonic acid resin but mechanical properties decrease as ion exchange capacity increases. The ion exchange resin of high exchange capacity might even be dissolved in water under extreme conditions. As mentioned in EP0031724, ion exchange capacity of the membrane used in electrolytic bath should be between 0.5 and 1.6 mmol/g (dry resin), preferably between 0.8 and 1.2 mmol/g. In the case that the total ion exchange capacity is lower than 0.5 mmol/g, electrical resistance of the membrane would be higher and thereby electrolyzer voltage and energy consumption are higher too, which does not satisfy industrial application. In the case that the total ion exchange capacity is higher than 1.6 mmol/g, the membrane materials have poor mechanical properties and thereby the life span and utilization will be limited. To increase exchange capacity and decrease loss of mechanical properties to the greatest extent, some alternative methods are to utilize composite membranes. For example in U.S. Pat. No. 5,654,109 and U.S. Pat. No. 5,246,792, bilayer or three-layer membrane materials were composited, wherein the inner membrane of high EW value undertakes the responsibility for conferring mechanical strength while the outer membrane(s) of low EW value takes responsibility for ion conduction. Multiple-layer membranes of different ion exchange capacity were combined in U.S. Pat. No. 5,981,097; while the composite membrane was obtained by combining the biaxial stretched polytetrafluroethylene porous membrane and resin of low EW value in U.S. Pat. No. 5,082,472. Although the above-mentioned methods retain mechanical properties of membranes to some extent, those methods are relatively poor at improving uniformity and conductivity of ion conduction.

In order to enhance mechanical strength and size stability of ion exchange membrane, one solution is to modify resin structure through a method well known in the art that crosslinkable groups are introduced into resin structure. For example, as used in US 20020014405 and U.S. Pat. No. 6,767,977, diene monomers were introduced into resin structure. CN 200480033602.1 discloses a method for introducing nitrile groups into polymerization system, wherein the nitrile groups were crosslinked after treatment and thereby mechanical strength of the membrane was enhanced. CN 200480033631.8 discloses a method for introducing bromine, chlorine or iodine groups into polymerization system followed by crosslinking in the presence of electron beam. An alternative solution is to shorten sulfonyl fluoride pendant group of comonomer to thereby enhance mechanical strength of membrane materials at the same time of increasing ion exchange capacity. However, as mentioned in U.S. Pat. No. 6,680,346, the polymers synthesized from short pendant group sulfonyl fluoride-containing monomers are subjected to cyclization due to different polymerization conditions, which results in chain transfer during polymerization and thereby causes a decrease in molecular weight and mechanical strength of the materials. As the molar ratio of short pendant group sulfonyl-containing monomer to tetrafluoroethylene monomer increases, said side reaction may be further promoted, which limits increase of ion exchange capacity and material stability.

When applying perfluorinated sulfonic acid resin to fuel cells as membrane materials, which is the most important application of perfluorinated sulfonic acid resin, key requirements for this kind of membrane electrode are its chemical stability and capability of enhancing electrode catalyst's resistance to carbon monoxide poisoning, wherein said membrane electrode is formed from ion exchange membrane and catalyst layer. The membrane electrodes of fuel cells that are extensively investigated and exemplified nowadays generally have the working temperature between 25° C. and 80° C. Catalyst layer of membrane electrode may be subjected to an outbreak of poisoning once the CO content in the circumstance reaches 10 ppm. To overcome many difficulties of membrane electrodes of low-temperature fuel cells that can hardly be resolved, for example, how to increase activity and utilization of catalyst, how to enhance electrode catalyst's resistance to carbon monoxide poisoning, and the like, an effective resolution is to increase operating temperature of fuel cells. Resistance of membrane electrode catalyst to CO will be increased to about 1000 ppm when the temperature exceeds 100° C. Development of high-temperature proton exchange membrane may better improve electrical efficiency of fuel cells and reduce costs of cell system so as to better satisfy commercialization of fuel cells. At present, main countries in the world researching fuel cells start to put massive manpower and material resources in the research. Current sulfonic acid resin comprising long pendant groups cannot meet requirements for use at high temperature.

SUMMARY OF THE INVENTION

One objective of the present invention is to provide a high capacity perfluorinated ion exchange membrane which comprises two kinds of sulfonyl fluoride-containing short pendant groups of different structures and bromine-containing pendant groups and have high ion exchange capacity and good mechanical properties. Another objective of the present invention is to provide a method for preparing the above-mentioned high exchange capacity perfluorinated resin. A further objective of the present invention is to provide an ion exchange membrane prepared from the above-mentioned high exchange capacity perfluorinated resin. A further objective of the present invention is to provide a fuel cell or electrolytic cell comprising the above-mentioned ion exchange membrane. A still further objective of the present invention is to provide a use of the above-mentioned high exchange capacity perfluorinated resin.

The objectives of the present invention may be achieved by utilizing the technical solutions as described hereinafter:

In one aspect, the present invention provides a high exchange capacity perfluorinated ion exchange resin which is prepared by multivariate copolymerization of tetrafluoroethylene, two kinds of sulfonyl fluoride short pendant group-containing vinyl ether monomers of different structures, and a bromine pendant group-containing vinyl ether monomer. Such resin comprises repeating unit as shown in formula (I) below:

wherein n is an integer between 0 to 3, preferably n=0; m is an integer between 2 to 4; a, b and c are an integer between 3 and 15 respectively, while a', b' and c' are an integer between 1 and 3 respectively; x/(x+y+z)=0.2-0.7, y/(x+y+z)=0.2-0.79, z/(x+y+z)=0.01-0.1 (molar ratio).

It is preferred that said two kinds of sulfonyl fluoride short pendant group-containing vinyl ether monomers of different structures have formulas as shown below respectively:

Said bromine pendant group-containing vinyl ether monomer has formula:

wherein n=0-3, preferably n=0; m is an integer between 2 and 4.

Preferably, molar percent of each polymerization monomer in said resin are: the total molar percent of tetrafluoroethylene is 50-85%; the total molar percent of said two kinds of sulfonyl fluoride short pendant group-containing vinyl ether polymerization monomers of different structures is 5-49%, and the total molar percent of bromine pendant group-containing vinyl ether polymerization monomer is 1-10%.

Preferably, the preferred molar percent of each polymerization monomer in said resin are: the total molar percent of tetrafluoroethylene is 70-80%; the total molar percent of said two kinds of sulfonyl fluoride short pendant group-containing vinyl ether polymerization monomers of different structures is 15-29%, and the total molar percent of bromine pendant group-containing vinyl ether polymerization monomer is 1-5%.

Preferably, the molar ratio of the two kinds of sulfonyl fluoride short pendant group-containing vinyl ether monomers (1) and (2) polymerization monomers of different structures is 0.2-0.8:0.8-0.2, preferably 0.4-0.6:0.6-0.4.

In another aspect, the present invention provides a preparation method for the above-mentioned high exchange capacity perfluorinated resin, comprising subjecting tetrafluoroethylene, two kinds of sulfonyl fluoride short pendant group-containing vinyl ether monomers of different structures, and bromine pendant group-containing vinyl ether monomer in the presence of initiator to polymerization. Preferably, reaction time of said polymerization is 1-8 hours, reaction temperature is 10-80° C. and reaction pressure is 2-10 MPa.

Preferably, said initiator may be one or more selected from the group of $N_2F_2$, perfluoroalkyl peroxide and persulfate.

Preferably, said perfluoroalkyl peroxide may be one or more selected from the group of perfluoroalkylacyl peroxide, perfluoroalkoxyacyl peroxide, peroxide where the peroxidated portion contains fluoroalkylacyl and peroxide where the peroxidated portion contains fluoroalkoxyacyl; said persulfate may be one or more selected from the group of ammonium persulfate, alkali metal persulfide and alkaline earth metal persulfide.

More preferably, said perfluoroalkyl peroxide may be one or more selected from the group of perfluoropropionyl peroxide, 3-chlorofluoropropionyl peroxide, perfluoromethoxy acetyl peroxide, ω-H-perfluorobutanoyl peroxide, ω-$SO_2F$-perfluoro-2,5,8-trimethyl-3,6,9-trioza-undecyl peroxide $CF_3CF_2CF_2CO—OO—COCF_2CF_2CF_3$, $CF_3CF_2CF_2OCFCF_3CO—OO—COCFCF_3OCF_2CF_2CF_3$, $CF_3CF_2CH_2CO—OO—COCH_2CF_2CF_3$ and $CF_3OCF_2CF_2CO—OO—COCF_2CF_2OCF_3$; said persulfate may be selected from the group of ammonium persulfate and potassium persulfate.

Preferably, said preparation method may comprise a step of emulsion polymerization conducted in water phase.

Preferably, in the step of emulsion polymerization, emulsifier may be one or more selected from anionic emulsifier, for example sodium aliphatate, sodium lauryl sulfate, sodium alkylsulfonate, and sodium alkylarylsulfonate; and non-ionic emulsifier, for example alkylphenol polyetherols, such as nonylphenol polyoxyethylene ether, polyoxyethylene fatty acid, and polyoxyethylene fatty acid ether.

More preferably, in the step of emulsion polymerization, weight percentage concentration of emulsifier in water is 0.1-20%, weight percentage concentration of two kinds of sulfonyl fluoride short pendant group-containing vinyl ether monomers of different structures in water is 5-30%, and weight percentage concentration of bromine pendant group-containing vinyl ether monomer is 1-12%.

In a further aspect, the present invention provides an ion exchange membrane prepared from the above-mentioned high exchange capacity perfluorinated resin.

In a still further aspect, the present invention provides a fuel cell or electrolytic cell device comprising the above-mentioned ion exchange membrane; said fuel cell is preferably proton membrane fuel cell or high temperature fuel cell, more preferably high temperature proton membrane fuel cell; said electrolytic cell is preferably chlor-alkali electrolytic cell.

In a still further aspect, the present invention provides use of the above-mentioned high exchange capacity perfluorinated resin in preparation of ion exchange membrane of fuel cell or electrolytic cell devices; said fuel cell is preferably proton membrane fuel cell or high temperature fuel cell, more preferably high temperature proton membrane fuel cell; said electrolytic cell is preferably chlor-alkali electrolytic cell; it is preferred that the bromine pendant groups are chemically crosslinked by cyclization before use.

In comparison with prior arts, the present invention at least has the following advantages:

1. The perfluorinated resin of the present invention comprises two kinds of sulfonyl fluoride short pendant groups of different structures and bromine pendant group, which resolves the conflict that ion exchange capacity and mechanical strength are opposite in prior arts and provides a perfluorinated resin having high ion exchange capacity and good mechanical properties at the same time.

2. The perfluorinated resin of the present invention comprises two kinds of sulfonyl fluoride short pendant groups of different structures and cyano pendant group, which resolved the problem that yield of the obtained resin molecule is not high enough due to chain transfer during polymerization of short pendant group sulfonyl fluoride-containing vinyl ether monomers, wherein the reaction mechanism in details is known as described below: firstly, two kinds of sulfonyl fluoride short pendant group-containing vinyl ether monomers of different structures are utilized during polymerization, and the two kinds of monomers work with each other in cooperation; secondly, in the polymerization system, the existing bromine-containing vinyl ether monomer interacts with other two kinds of vinyl ether monomers at the same time of participating in polymerization. The presence of these different kinds of vinyl ether drives the polymerizations to pursue synergistically such that a high molecular weight can be obtained, which eliminates cyclization due to chain transfer.

3. The present invention subjects tetrafluoroethylene (TFE) to multivariate copolymerization with two kinds of sulfonyl fluoride short pendant group-containing vinyl ether monomers of different structures and bromine pendant group-containing monomer to obtain high exchange capacity perfluorinated resin of high molecular weight, which has high chemical stability, high ion exchange capacity and good high-temperature mechanical stability.

The high exchange capacity perfluorinated resin of the present invention may be utilized to prepare ion exchange membrane of fuel cell (e.g. high-temperature fuel cell), chlor-alkali electrolytic cell and other devices. Membrane materials prepared from such resin has high current efficiency, low membrane electrical resistance and relatively high mechanical strength.

The present invention is described in details hereinafter.

The present invention provides a high exchange capacity perfluorinated exchange resin comprising two kinds of sulfonyl fluoride short pendant group-containing vinyl ether of different structures and bromine pendant group. Such perfluorinated resin is prepared by multivariate copolymerization of tetrafluoroethylene, two kinds of sulfonyl fluoride short pendant group-containing vinyl ether monomers of different structures, and a vinyl ether monomer containing bromine pendant groups. Molecular formula of the polymer chain is:

(I)

Wherein n is an integer between 0 to 3, preferably n=0; m is an integer between 2 to 4; a, b and c are an integer between 3 and 15 respectively, while a', b' and c' are an integer between 1 and 3 respectively; x/(x+y+z)=0.2-0.7, y/(x+y+z)=0.2-0.79, z/(x+y+z)=0.01-0.1.

Molar percent of each polymerization monomer in said resin are: the total molar percent of tetrafluoroethylene is 50-85%; the total molar percent of sulfonyl fluoride short pendant group-containing vinyl ether polymerization monomers is 5-49%, and the total molar percent of bromine pendant group-containing vinyl ether polymerization monomer is 1-10%.

Preferably, molar percent of each polymerization monomer in said resin are: the total molar percent of tetrafluoroethylene is 70-80%; the total molar percent of s sulfonyl fluoride short pendant group-containing vinyl ether polymerization monomers is 15-29%, and the total molar percent of bromine pendant group-containing vinyl ether polymerization monomer is 1-5%.

Said two kinds of sulfonyl fluoride short pendant group-containing vinyl ether monomers of different structures have formulas as shown below respectively:

(1)

(2)

Said bromine pendant group-containing vinyl ether monomer has formula:

Wherein n=0-3, preferably n=0; m is an integer between 2 and 4.

Preferably, the ratio of tetrafluoroethylene to sulfonyl fluoride short pendant group-containing vinyl ether monomer to bromine pendant group-containing vinyl ether monomer is: 50-85:5-49:1-10 (molar ratio). The molar ratio of the two kinds of vinyl ether monomers ((1) and (2)) polymerization monomers in resin containing sulfonyl fluoride short pendant groups of different structures is 0.2-0.8:0.8-0.2 (molar ratio). Preferably, the molar ratio of the two kinds of vinyl ether monomers ((1) and (2)) polymerization units in resin containing sulfonyl fluoride short pendant groups of different structures is 0.4-0.6:0.6-0.4 (molar ratio).

Number-average molecular weight of the above-mentioned high exchange capacity perfluorinated resin may be 100-600 thousands, preferably 150-300 thousands, most preferably 180-250 thousands. Molecular weight distribution value (i.e. ratio of weight-average molecular weight to number-average molecular weight) of the above-mentioned high exchange capacity perfluorinated resin may be 1.5-2.0.

The present invention provides a preparation method for the above-mentioned high exchange capacity perfluorinated resin comprising two kinds of sulfonyl fluoride short pendant group of different structures and bromine pendant group. Such preparation method produces said perfluorinated resin by subjecting tetrafluoroethylene monomer, two kinds of sulfonyl fluoride-containing vinyl ether monomers of different structure and a bromine pendant group-containing vinyl ether monomer in the presence of initiator to copolymerization (polymerization) at 10-80° C. The reaction time of said polymerization is 1-8 hours and reaction pressure is 2-10 MPa.

In the above-mentioned preparation method, initiators may be either initiators well-known in the arts or home-made initiators.

Said initiators are selected from $N_2F_2$, perfluoroalkyl peroxide or persulfate.

Preferably, said perfluoroalkyl peroxide includes perfluoroalkylacyl peroxide, perfluoroalkoxyacyl peroxide, peroxide where the peroxidated portion contains fluoroalkylacyl and peroxide where the peroxidated portion contains fluoroalkoxyacyl. Perfluoropropionyl peroxide, 3-chlorofluoropropionyl peroxide, perfluoromethoxy acetyl peroxide, ω-H-perfluorobutanoyl peroxide, ω-SO$_2$F-perfluoro-2,5,8-trimethyl-3,6,9-trioza-undecyl peroxide CF$_3$CF$_2$CF$_2$CO—OO—COCF$_2$CF$_2$CF$_3$, CF$_3$CF$_2$CF$_2$OCFCF$_3$CO—OO—COCFCF$_3$OCF$_2$CF$_2$CF$_3$, CF$_3$CF$_2$CH$_2$CO—OO—COCH$_2$CF$_2$CF$_3$ or CF$_3$OCF$_2$CF$_2$CO—OO—COCF$_2$CF$_2$OCF$_3$ is more preferred.

Preferably, said persulfate includes ammonium persulfate, alkali metal persulfide and alkaline earth metal persulfide; ammonium persulfate or potassium persulfate is more preferred.

Preferably, molar ratio of tetrafluoroethylene polymerization monomer to sulfonyl fluoride short pendant group-containing vinyl ether polymerization monomer s of different structure to bromine pendant group-containing vinyl ether polymerization monomer in resin is: 50-85:5-49:1-10.

In resin, molar ratio of the two kinds of vinyl ether polymerization units ((1) and (2)) containing sulfonyl fluoride short pendant groups of different structures is preferably 0.2-0.8:0.8-0.2. More preferably, molar ratio of the two kinds of vinyl ether polymerization units ((1) and (2)) containing sulfonyl fluoride short pendant groups of different structures is 0.4-0.6:0.6-0.4.

Preferably, the above-mentioned copolymerization is an emulsion polymerization conducted in water phase. Procedures of the emulsion polymerization are described in details hereinafter:

1) Charging pure water, two kinds of sulfonyl fluoride short pendant group-containing vinyl ether monomers in different portions, bromine pendant group-containing vinyl ether monomer and emulsifier into reaction vessel after cleaning the vessel, wherein total weight percentage concentration of emulsifier in water is 0.1-20%, total weight percentage concentration of sulfonyl fluoride short pendant group-containing vinyl ether monomers in water is 5-30%, and weight percentage concentration of bromine pendant group-containing vinyl ether monomer in water is 1-12%;

Said emulsifier includes one or more selected from anionic emulsifier and/or non-ionic emulsifier. Aanionic emulsifier includes sodium aliphatate, sodium lauryl sulfate, sodium alkylsulfonate, sodium alkylarylsulfonate and the like; non-ionic emulsifier includes alkylphenol polyetherols, such as nonylphenol polyoxyethylene ether, polyoxyethylene fatty acid, and polyoxyethylene fatty acid ether. The above-mentioned emulsifiers may be used separately or in combination;

2) Charging tetrafluoroethylene monomer into the reaction vessel via gas metering tank until the pressure reaches 2-10 MPa;

3) Charging initiator into the reaction system via metering pump to initiate the reaction after heating the reaction vessel to a temperature of 10-80° C., and then recharging tetrafluoroethylene monomer and initiator into the reaction vessel continually to maintain the pressure of 2-10 MPa, wherein the reaction time is 1-8 hours;

4) Stopping charging initiator and tetrafluoroethylene monomer into the reaction vessel at the end of the reaction, venting and recovering unreacted tetrafluoroethylene monomer via vent line and recycling tank of the reaction vessel to obtain ivory-white aggregate slurry; discharging the liquid slurry into after-treatment device via discharge system; high-speed shearing and separating the slurry by filteration to obtain white polymer powder; drying the powder at 100° C. in an oven to obtain high ion exchange capacity perfluorinated ion exchange resin comprising two kinds of sulfonyl fluoride short pendant groups of different structure and bromine pendant group; recycling sulfonyl fluoride-containing vinyl ether monomers and bromine pendant group-containing vinyl ether monomer in the filtrate via recycling system.

In step 1), ratio of the two kinds of sulfonyl fluoride short pendant group-containing vinyl ether monomers (1) and (2) is 0.2-0.8:0.8-0.2 (molar ratio); preferably, the two kinds of sulfonyl fluoride short pendant group-containing vinyl ether monomers (1) and (2) is 0.4-0.6:0.6-0.4 (molar ratio).

Said initiators are selected from N$_2$F$_2$, perfluoroalkyl peroxide or persulfate; the skilled in the art can determine concentration of initiator.

Said perfluoroalkyl peroxide includes perfluoroalkylacyl peroxide, perfluoroalkoxyacyl peroxide, peroxide where the peroxidated portion contains fluoroalkylacyl or peroxide where the peroxidated portion contains fluoroalkoxyacyl.

Said persulfate includes ammonium sulfate, alkali metal persulfide or alkaline earth metal persulfide; ammonium persulfate or potassium persulfate is preferred.

The high ion exchange capacity perfluorinated ion exchange resin comprising two kinds of sulfonyl fluoride short pendant groups of different structures and bromine pendant group as described in accordance with the present invention may be applied in preparation of ion exchange membrane of fuel cells or high-temperature fuel cells.

Application of high ion exchange capacity perfluorinated ion exchange resin comprising two kinds of sulfonyl fluoride short pendant groups of different structures and bromine pendant group as described in accordance with the present invention specifically refers to functioning as ion exchange membrane of proton membrane fuel cells, high-temperature proton membrane fuel cells, chlor-alkali electrolytic cells and other devices. Such ion exchange membrane has high chemical stability, high current efficiency, low membrane electrical resistance, high size stability and relatively high mechanical strength and etc.

Application of high ion exchange capacity perfluorinated ion exchange resin comprising two kinds of sulfonyl fluoride short pendant groups of different structures and bromine pendant group as described in accordance with the present invention may refer to that such resin can be prepared to perfluorinated solfonic acid ion exchange membrane of appropriate thickness through solution casting process or membrane materials of appropriate thickness by high-temperature melting extrusion in melting extrusion equipment. Subsequently, the membrane materials may be crosslinked by debrominating the bromine pendant groups following means well-known in the art, for example radiation crosslinking, heat treatment crosslinking, crosslinking initiated by introducing photoinitiator or crosslinking initiated by introducing radical initiator. Sulfonyl fluoride pendant groups can then be converted to sulfonic acid pendant groups. The obtained perfluorinated ion exchange membrane can be applied to fuel cells, high-temperature fuel cells or chlor-alkali electrolytic cells very well since said membrane has not only resistance to various chemical media but also high conductivity, high mechanical strength, high size stability and low membrane electrical resistance.

As for the application of high ion exchange capacity perfluorinated ion exchange resin comprising two kinds of sulfonyl fluoride short pendant groups of different structures and bromine pendant group as described in accordance with the present invention to fuel cells, crosslinking based on debromination of bromine pendant groups may further improve water retaining capacity, size stability and mechanical strength of the ion exchange membrane and also improve usability of the membrane materials effectively and thereby further prolong service life of the membrane materials.

Beneficial effects of the present invention are:

The perfluorinated ion exchange resin synthesized in the present invention has ion exchange capacity between 0.5-2.6 mmol/g (dry resin), following the rule that smaller ion exchange capacity results in higher mechanical strength, wherein mechanical strength of the non-crosslinking resin having ion exchange capacity between 1.28-1.95 mmol/g exceeds 20 MPa. The obtained membrane materials have excellent thermal stability and the mechanical strength thereof exceeds 30 MPa after crosslinking treatment. Conductivity of the membrane materials detected at room temperature is higher than 0.2 S/cm while the conductivity detected at a temperature of 100° C. and a humidity of 45% is still higher than 0.05 S/cm, which can meet requirements of fuel cell's proton membrane materials and chlor-alkali electrolytic membrane materials.

BEST MODES OF THE INVENTION

The present invention will be further described hereinafter by embodiments but not be limited by the embodiments. Unless otherwise specified, reaction vessels used in all the examples are a 10 L stainless autoclave, equipped with temperature sensor, pressure sensor, heating circulation system, cooling circulation system, stirring motor, inner cooling pipe, liquid metering pump, gas feeding inlet valve, liquid feeding inlet valve, and material discharge valve inside the autoclave.

Unless otherwise specified, ion exchange capacities of the following examples were all measured after hydrolysis of sulfonyl fluoride to sulfonic acid.

Perfluoroalkyl initiators used in synthesis process of the present invention may be prepared according to the techniques known in the art and the recommended preparation method may be found in J. Org. Chem., 1982, 47(11); 2009-2013 for reference.

Potassium persulfate, ammonium persulfate and $N_2F_2$ gas used in synthesis process of the present invention may be purchased, wherein the used potassium persulfate and ammonium persulfate may be purchased through China National Medicines Corporation Ltd. While $N_2F_2$ gas may be commercially available from Dongyue Chemicals Co., Ltd.

Tetrafluoroethylene monomer used in synthesis process of the present invention may be purchased from Shandong Dongyue Polymer Materials Co., Ltd.; sulfonyl fluoride pendant group-containing vinyl ether monomers may be prepared according to the preparation methods as described in U.S. Pat. Nos. 3,560,568 and 6,624,328; in the present invention, sulfonyl fluoride pendant group-containing vinyl ether monomers were obtained according to Chinese patent applications CN 200910229444.1, CN 200910229446.0 and CN 200910230218.5; bromine pendant group-containing vinyl ether monomer may be prepared according to the preparation methods as described in EP 0380129 and EP 0194862.

Example 1

A reaction vessel was cleaned and charged with 5.0 L of deionized water and 100 g of sodium lauryl benzenesulfate and 125 g of nonylphenol polyoxyethylene ether NP-10 as emulsifiers followed by starting stirring device. The vessel was evacuated and then swept with high purity nitrogen for three times. After the measured oxygen content of the vessel was lower than 1 ppm, the vessel was evacuated again and charged with 500 g of sulfonyl fluoride pendant group-containing vinyl ether monomer (1) ($F_2C$=$CF$—$O$—$CF_2$—$CF_2$—$SO_2F$), 650 g of sulfonyl fluoride pendant group-containing vinyl ether monomer (2) ($F_2C$=$CF$—$O$—$CF_2$—$CF_2$—$CF_2CF_2$—$SO_2F$) and 405 g of bromine pendant group-containing vinyl ether monomer ($F_2C$=$CF$—$O$—$CF_2CF_2$—$Br$) via liquid feeding inlet valve. To the reaction vessel was charged tetrafluoroethylene monomer until the pressure reached 2.9 MPa. The reaction vessel was heated to 20° C., charged with 2.6 g of perfluorobutanoyl peroxide ($CF_3CF_2CF_2CO$—$OO$—$CCF_2CF_2CF_3$) via metering pump to initiate polymerization and charged with tetrafluoroethylene monomer ($CF_2$=$CF_2$) continually to maintain reaction pressure of 2.9 MPa, with addition of 0.75 g of initiator into the system every 15 minutes. After 2 hours, addition of initiator was stopped but the reaction was allowed to pursue for 15 minutes followed by stopping adding tetrafluoroethylene monomer. The reaction vessel was cooled by cooling circulation system and unreacted tetrafluoroethylene monomer was recovered by recycling system at the same time. The ivory-white slurry in the vessel was discharged into after-treatment system via bottom discharge valve, high-speed sheared and separated by filtration to obtain white polymer powder which was then dried at 100° C. in an oven to finally obtain the perfluorinated ion exchange resin comprising sulfonyl fluoride short pendant groups and bromine pendant group. Sulfonyl fluoride-containing vinyl ether monomers and bromine pendant group-containing vinyl ether monomer in the filtrate were recovered via recycling system for reuse.

Data of the obtained polymer: The product obtained was proved to be a multicomponent copolymer by $F^{19}$ NMR and IR analysis. NMR integral values of fluorine suggested in the polymer structure molar percent of tetrafluoroethylene polymerization monomer is 62.71%, molar percent of sulfonyl fluoride pendant group-containing vinyl ether monomer (1) is 16.5%, molar percent of sulfonyl fluoride pendant group-containing vinyl ether monomer (2) is 16.3%, molar percent of bromine pendant group-containing vinyl ether monomer is 4.49% and total ion exchange capacity is 1.77 mmol/g (dry resin). TGA results showed decomposition temperature ($T_d$) of the resin in nitrogen atmosphere is 401° C.; IR spectrogram: 1468 $cm^{-1}$ is the vibration absorption peak of S=O of sulfonyl fluoride; the two most intense absorptions of 1200 and 1148 $cm^{-1}$ resulted from vibration of CF; 720 $cm^{-1}$ and 641 $cm^{-1}$ resulted from vibration absorptions of —$CF_2$—$CF_2$— after copolymerization of tetrafluoro ethylene.

Example 2

A reaction vessel was cleaned and charged with 5.0 L of deionized water and 220 g of sodium lauryl benzenesulfate followed by starting stirring device. The vessel was evacuated and then swept with high purity nitrogen for three times. After the measured oxygen content of the vessel was lower than 1 ppm, the vessel was evacuated again and charged with 500 g of sulfonyl fluoride pendant group-containing vinyl ether monomer (1) ($F_2C$=$CF$—$O$—$CF_2CF_2$—$SO_2F$), 405 g of sulfonyl fluoride pendant group-containing vinyl ether monomer (2) ($F_2C$=$CF$—$O$—$CF_2CF_2CF_2CF_2$—$SO_2F$) and 225 g of bromine pendant group-containing vinyl ether monomer ($F_2C$=$CF$—$O$—$CF_2CF_2CF_2Br$) via liquid feeding inlet valve. To the reaction vessel was charged tetrafluoroethylene monomer until the pressure reached 2.9 MPa. The reaction vessel was heated to 35° C., charged with 8.0 g of perfluoropropoxypropyl peroxide ($CF_3CF_2CF_2OCF(CF_3)CO-OO-CCF(CF_3)OCF_2CF_2CF_3$) via metering pump to initiate polymerization and charged with tetrafluoroethylene monomer ($CF_2=CF_2$) continually to maintain reaction pressure of 2.9 MPa, with addition of 2.3 g of initiator into the system every 25 minutes. After 2.5 hours, addition of initiator was stopped but the reaction was allowed to pursue for 25 minutes followed by stopping adding tetrafluoroethylene monomer. The reaction vessel was cooled by cooling circulation system and unreacted tetrafluoroethylene monomer was recovered by recycling system at the same time. The ivory-white slurry in the vessel was discharged into after-treatment system via bottom discharge valve, high-speed sheared and separated by filtration to obtain white polymer powder which was then dried at 100° C. in an oven to finally obtain the perfluorinated ion exchange resin comprising sulfonyl fluoride short pendant groups and bromine pendant group. Sulfonyl fluoride-containing vinyl ether monomers and bromine pendant group-containing vinyl ether monomer in the filtrate were recovered via recycling system for reuse.

Figure 1:
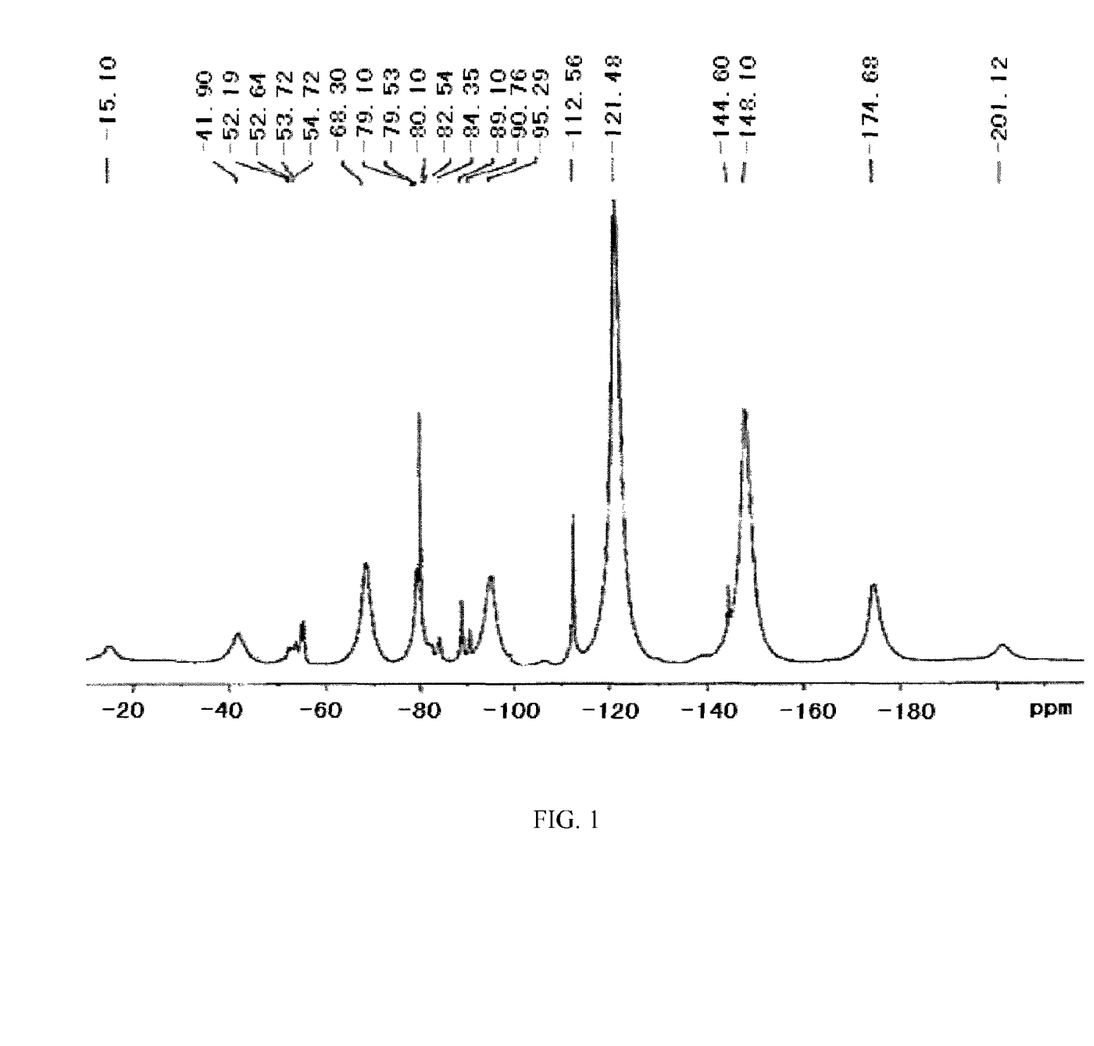
FIG. 1 depicts the $F^{19}$ NMR spectrogram of a perfluorinated resin in an embodiment of the present invention.

Data of the obtained polymer: The product obtained was proved to be a multicomponent copolymer by $F^{19}$ NMR (as shown in FIG. 1) and IR analysis. NMR integral values of fluorine suggested in the polymer structure molar percent of tetrafluoroethylene polymerization monomer is 73.8%, molar percent of sulfonyl fluoride pendant group-containing vinyl ether monomer (1) is 15%, molar percent of sulfonyl fluoride pendant group-containing vinyl ether monomer (2) is 9%, molar percent of bromine pendant group-containing vinyl ether monomer is 2.2% and total ion exchange capacity is 1.53 mmol/g (dry resin). TGA results showed decomposition temperature ($T_d$) of the resin in nitrogen atmosphere is 405° C.; IR spectrogram: 1468 $cm^{-1}$ is the vibration absorption peak of S=O of sulfonyl fluoride; the two most intense absorptions of 1200 and 1148 $cm^{-1}$ resulted from vibration of CF; 720 $cm^{-1}$ and 641 $cm^{-1}$ resulted from vibration absorptions of $-CF_2-CF_2-$ after copolymerization of tetrafluoroethylene.

Example 3

A reaction vessel was cleaned and charged with 5.0 L of deionized water and 120 g of sodium lauryl benzenesulfate and 95 g of nonylphenol polyoxyethylene ether NP-10 as emulsifiers followed by starting stirring device. The vessel was evacuated and then swept with high purity nitrogen for three times. After the measured oxygen content of the vessel was lower than 1 ppm, the vessel was evacuated again and charged with 300 g of sulfonyl fluoride pendant group-containing vinyl ether monomer (1) ($F_2C=CF-O-CF_2CF_2-SO_2F$), 610 g of sulfonyl fluoride pendant group-containing vinyl ether monomer (2) ($F_2C=CF-O-CF_2CF_2CF_2CF_2-SO_2F$) and 250 g of bromine pendant group-containing vinyl ether monomer ($F_2C=CF-O-CF_2CF_2CF_2CF_2Br$) via liquid feeding inlet valve. To the reaction vessel was charged tetrafluoroethylene monomer until the pressure reached 3.2 MPa. The reaction vessel was heated to 80° C., charged with 320 g of 10% ammonium persulfate water solution via metering pump to initiate polymerization and charged with tetrafluoroethylene monomer ($CF_2=CF_2$) continually to maintain reaction pressure of 3.2 MPa. After 3 hours, addition of tetrafluoroethylene monomer was stopped. The reaction vessel was cooled by cooling circulation system and unreacted tetrafluoroethylene monomer was recovered by recycling system at the same time. The ivory-white slurry in the vessel was discharged into after-treatment system via bottom discharge valve, high-speed sheared and separated by filtration to obtain white polymer powder which was then dried at 100° C. in an oven to finally obtain the perfluorinated ion exchange resin comprising sulfonyl fluoride short pendant groups and bromine pendant group. Sulfonyl fluoride-containing vinyl ether monomers and bromine pendant group-containing vinyl ether monomer in the filtrate were recovered via recycling system for reuse.

Figure 2:
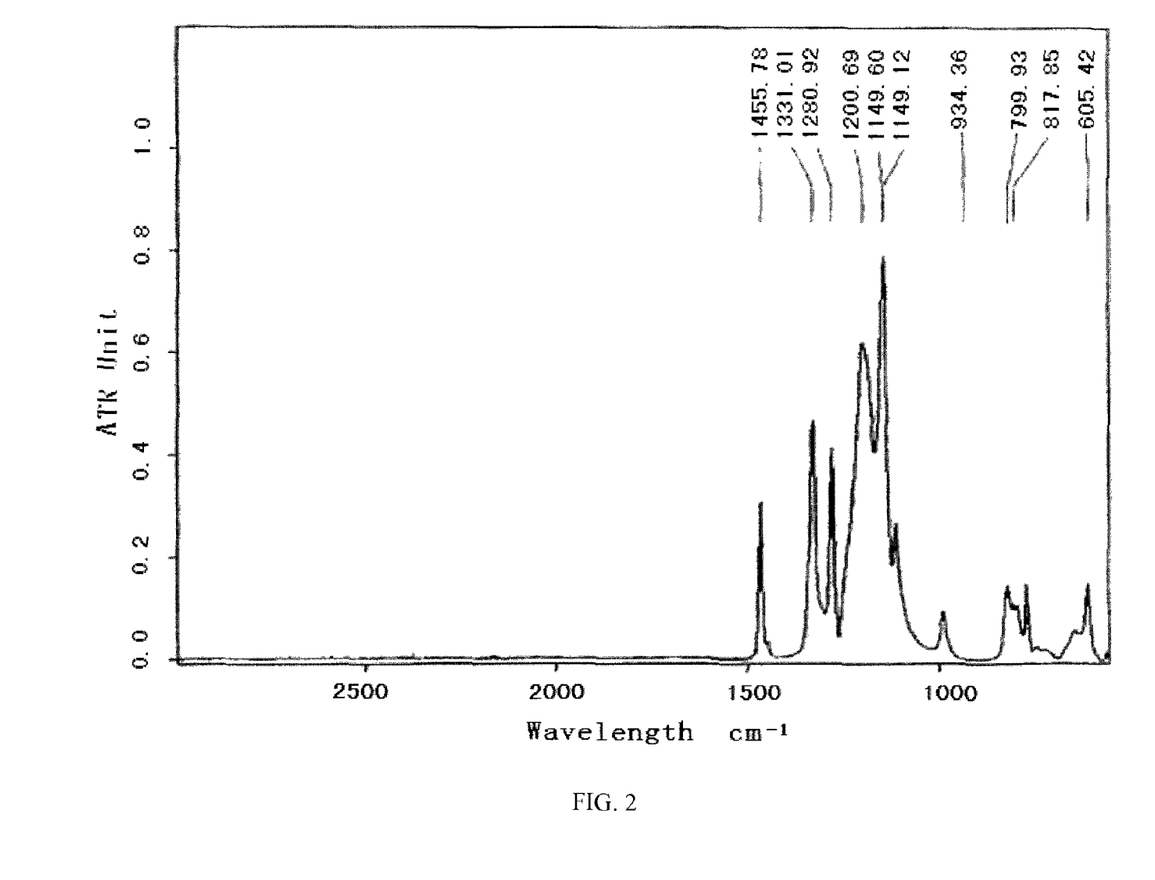
FIG. 2 depicts the infrared spectrogram of a perfluorinated resin in an embodiment of the present invention.

Data of the obtained polymer: The product obtained was proved to be a multicomponent copolymer by $F^{19}$ NMR and IR (as shown in FIG. 2) analysis. NMR integral values of fluorine suggested in the polymer structure molar percent of tetrafluoroethylene polymerization monomer is 75.7%, molar percent of sulfonyl fluoride pendant group-containing vinyl ether monomer (1) is 8.9%, molar percent of sulfonyl fluoride pendant group-containing vinyl ether monomer (2) is 12.28%, molar percent of bromine pendant group-containing vinyl ether monomer is 3.12% and total ion exchange capacity is 1.34 mmol/g (dry resin). TGA results showed decomposition temperature ($T_d$) of the resin in nitrogen atmosphere is 395° C.; IR spectrogram: 1468 $cm^{-1}$ is the vibration absorption peak of S=O of sulfonyl fluoride; 940 $cm^{-1}$ resulted from vibration of $-CF_3$; the two most intense absorptions of 1200 and 1148 $cm^{-1}$ resulted from vibration of CF; 720 $cm^{-1}$ and 641 $cm^{-1}$ resulted from vibration absorptions of $-CF_2-CF_2-$ after copolymerization of tetrafluoroethylene.

Example 4

A reaction vessel was cleaned and charged with 5.0 L of deionized water and 180 g of sodium lauryl benzenesulfate and 45 g of nonylphenol polyoxyethylene ether NP-10 as emulsifiers followed by starting stirring device. The vessel was evacuated and then swept with high purity nitrogen for three times. After the measured oxygen content of the vessel was lower than 1 ppm, the vessel was evacuated again and charged with 300 g of sulfonyl fluoride pendant group-containing vinyl ether monomer (1) ($F_2C=CF-O-CF_2CF_2-SO_2F$), 400 g of sulfonyl fluoride pendant group-containing vinyl ether monomer (2) ($F_2C=CF-O-CF_2CF_2CF_2CF_2-SO_2F$) and 250 g of bromine pendant group-containing vinyl ether monomer ($F_2C=CF-O-CF_2CF(CF_3)OCF_2CF_2Br$) via liquid feeding inlet valve. To the reaction vessel was charged tetrafluoroethylene monomer until the pressure reached 2.7 MPa. The reaction vessel was heated to 20° C., charged with $N_2F_2$ into the vessel under control of gas flow meter to initiate polymerization and charged with tetrafluoroethylene monomer ($CF_2=CF_2$) to maintain gradual increase of reaction pressure from 2.7 MPa, with addition of initiator $N_2F_2$ into the system continually. After 2 hours, reaction pressure of the vessel reached 3.0 MPa. Addition of initiator was stopped but the reaction was allowed to pursue for 1 minutes followed by stopping adding tetrafluoroethylene monomer. The reaction vessel was cooled by cooling circulation system and unreacted tetrafluoroethylene monomer was recovered by recycling system at the same time. The ivory-white slurry in the vessel was discharged into after-treatment system via bottom discharge valve, high-speed sheared and separated by filtration to obtain white polymer powder which was then dried at 100° C. in an oven to finally obtain the perfluorinated ion exchange resin comprising sulfonyl fluoride short pendant groups and bromine pendant group. Sulfonyl fluoride-containing vinyl ether monomers and bromine pendant group-containing vinyl ether monomer in the filtrate were recovered via recycling system for reuse.

Figure 3:
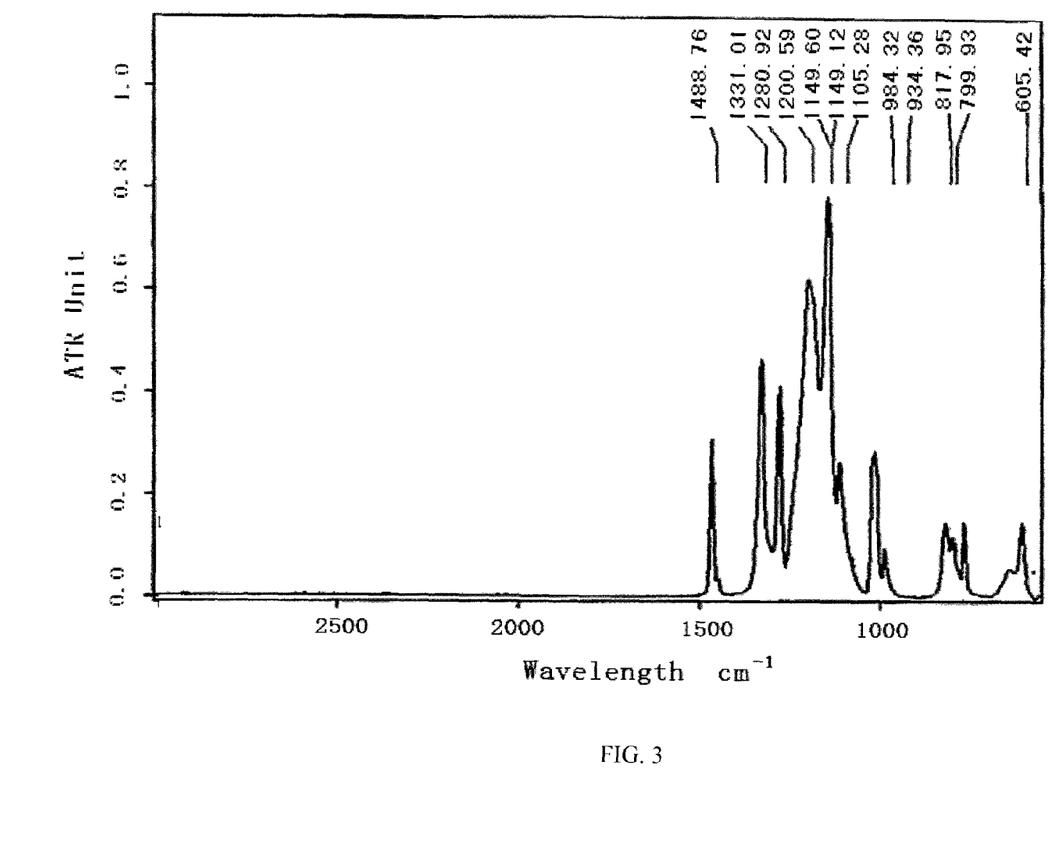
FIG. 3 depicts the infrared spectrogram of a perfluorinated resin in an embodiment of the present invention.

Data of the obtained polymer: The product obtained was proved to be a multicomponent copolymer by $F^{19}$ NMR and IR (as shown in FIG. 3) analysis. NMR integral values of fluorine suggested in the polymer structure molar percent of tetrafluoroethylene polymerization monomer is 74.5%, molar percent of sulfonyl fluoride pendant group-containing vinyl ether monomer (1) is 10.5%, molar percent of sulfonyl fluoride pendant group-containing vinyl ether monomer (2) is 13.79%, molar percent of bromine pendant group-containing vinyl ether monomer is 1.21% and total ion exchange capacity is 1.54 mmol/g (dry resin). TGA results showed decomposition temperature ($T_d$) of the resin in nitrogen atmosphere is 387° C.; IR spectrogram: 1468 cm$^{-1}$ is the vibration absorption peak of S=O of sulfonyl fluoride; the two most intense absorptions of 1200 and 1148 cm$^{-1}$ resulted from vibration of CF; 720 cm$^{-1}$ and 641 cm$^{-1}$ resulted from vibration absorptions of —CF$_2$—CF$_2$— after copolymerization of tetrafluoroethylene.

Example 5

A reaction vessel was cleaned and charged with 5.0 L of deionized water and emulsifier 215 g of sodium lauryl benzenesulfate followed by starting stirring device. The vessel was evacuated and then swept with high purity nitrogen for three times. After the measured oxygen content of the vessel was lower than 1 ppm, the vessel was evacuated again and charged with 780 g of sulfonyl fluoride pendant group-containing vinyl ether monomer (1) (F$_2$C=CF—O—CF$_2$CF$_2$—SO$_2$F), 720 g of sulfonyl fluoride pendant group-containing vinyl ether monomer (2) (F$_2$C=CF—O—CF$_2$CF$_2$CF$_2$CF$_2$—SO$_2$F) and 650 g of bromine pendant group-containing vinyl ether monomer (F$_2$C=CF—O—CF$_2$CF$_2$Br) via liquid feeding inlet valve. To the reaction vessel was charged tetrafluoroethylene monomer until the pressure reached 2.8 MPa. The reaction vessel was heated to 25° C., charged with N$_2$F$_2$ into the vessel under control of gas flow meter to initiate polymerization, and charged with tetrafluoroethylene monomer (CF$_2$=CF$_2$) continually to maintain gradual increase of reaction pressure from 2.8 MPa, with addition of initiator N$_2$F$_2$ into the system continually. After 2 hours, reaction pressure of the vessel reached 3.2 MPa. Addition of initiator was stopped but the reaction was allowed to pursue for 1 minutes followed by stopping adding tetrafluoroethylene monomer. The reaction vessel was cooled by cooling circulation system and unreacted tetrafluoroethylene monomer was recovered by recycling system at the same time. The ivory-white slurry in the vessel was discharged into after-treatment system via bottom discharge valve, high-speed sheared and separated by filtration to obtain white polymer powder which was then dried at 100° C. in an oven to finally obtain the perfluorinated ion exchange resin comprising sulfonyl fluoride short pendant groups and bromine pendant group. Sulfonyl fluoride-containing vinyl ether monomers and bromine pendant group-containing vinyl ether monomer in the filtrate were recovered via recycling system for reuse.

Figure 4:
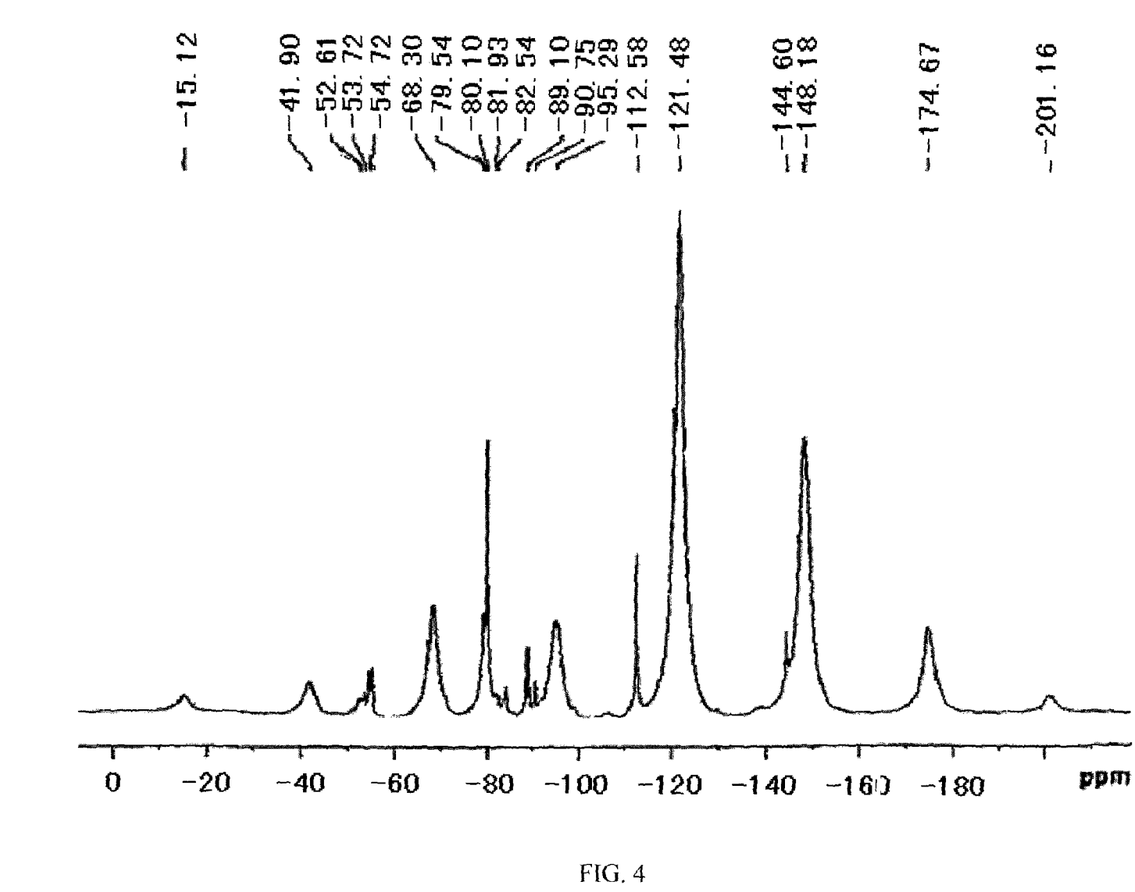
FIG. 4 depicts the $F^{19}$ NMR spectrogram of a perfluorinated resin in an embodiment of the present invention.

Data of the obtained polymer: The product obtained was proved to be a multicomponent copolymer by $F^{19}$ NMR (as shown in FIG. 4) and IR analysis. NMR integral values of fluorine suggested in the polymer structure molar percent of tetrafluoroethylene polymerization monomer is 67.14%, molar percent of sulfonyl fluoride pendant group-containing vinyl ether monomer (1) is 14.2%, molar percent of sulfonyl fluoride pendant group-containing vinyl ether monomer (2) is 11.46%, molar percent of bromine pendant group-containing vinyl ether monomer is 7.24% and total ion exchange capacity is 1.44 mmol/g (dry resin). TGA results showed decomposition temperature ($T_d$) of the resin in nitrogen atmosphere is 384° C.; IR spectrogram: 1468 cm$^{-1}$ is the vibration absorption peak of S=O of sulfonyl fluoride; 940 cm$^{-1}$ resulted from vibration of —CF$_3$; the two most intense absorptions of 1200 and 1148 cm$^{-1}$ resulted from vibration of CF; 720 cm$^{-1}$ and 641 cm$^{-1}$ resulted from vibration absorptions of —CF$_2$—CF$_2$— after copolymerization of tetrafluoroethylene.

Example 6

A reaction vessel was cleaned and charged with 5.0 L of deionized water and 225 g of emulsifier sodium lauryl benzenesulfate followed by starting stirring device. The vessel was evacuated and then swept with high purity nitrogen for three times. After the measured oxygen content of the vessel was lower than 1 ppm, the vessel was evacuated again and charged with 420 g of sulfonyl fluoride pendant group-containing vinyl ether monomer (1) (F$_2$C=CF—O—CF$_2$CF$_2$—SO$_2$F), 265 g of sulfonyl fluoride pendant group-containing vinyl ether monomer (2) (F$_2$C=CF—O—CF$_2$CF$_2$CF$_2$CF$_2$—SO$_2$F) and 350 g of bromine pendant group-containing vinyl ether monomer (F$_2$C=CF—O—CF$_2$CF$_2$CF$_2$CF$_2$Br) via liquid feeding inlet valve. To the reaction vessel was charged tetrafluoroethylene monomer until the pressure reached 5.2 MPa. The reaction vessel was heated to 45° C., charged with 20.2 g of ω-SO$_2$F-perfluoro-2,5,8-trimethyl-3,6,9-trioza-undecyl peroxide via metering pump to initiate polymerization and charged with tetrafluoroethylene monomer continually to maintain reaction pressure of 5.2 MPa, with addition of 6 g of the initiator into the system every 45 minutes. After 2 hours, addition of initiator was stopped but the reaction was allowed to pursue for 45 minutes followed by stopping adding tetrafluoroethylene monomer. The reaction vessel was cooled by cooling circulation system and unreacted tetrafluoroethylene monomer was recovered by recycling system at the same time. The ivory-white slurry in the vessel was discharged into after-treatment system via bottom discharge valve, high-speed sheared and separated by filtration to obtain white polymer powder which was then dried at 100° C. in an oven to finally obtain the perfluorinated ion exchange resin comprising sulfonyl fluoride short pendant groups and bromine pendant group. Sulfonyl fluoride-containing vinyl ether monomers and bromine pendant group-containing vinyl ether monomer in the filtrate were recovered via recycling system for reuse.

Data of the obtained polymer: The product obtained was proved to be a multicomponent copolymer by $F^{19}$ NMR and IR analysis. NMR integral values of fluorine suggested in the polymer structure molar percent of tetrafluoroethylene polymerization monomer is 80%, molar percent of sulfonyl fluoride pendant group-containing vinyl ether monomer (1) is 8.2%, molar percent of sulfonyl fluoride pendant group-containing vinyl ether monomer (2) is 9.92%, molar percent of bromine pendant group-containing vinyl ether monomer is 1.88% and total ion exchange capacity is 1.27 mmol/g (dry resin). TGA results showed decomposition temperature ($T_d$) of the resin in nitrogen atmosphere is 387° C.; IR spectrogram: 1468 cm$^{-1}$ is the vibration absorption peak of S=O of sulfonyl fluoride; the two most intense absorptions of 1200 and 1148 cm$^{-1}$ resulted from vibration of CF; 720 cm$^{-1}$ and 641 cm$^{-1}$ resulted from vibration absorptions of —CF$_2$—CF$_2$— after copolymerization of tetrafluoroethylene.

Examples 7

Examples 7 is included herein to illustrate preparation procedures of ion exchange membranes using perfluorinated ion exchange resins obtained in Examples 1-6 and mechanical properties thereof.

Preparation Procedures of Ion Exchange Membranes
Preparation of Aggregates:

The white powder products obtained in Examples 1-6 were extruded to prepare aggregates in small melting extrusion equipment, respectively, wherein extrusion temperature was set at 250° C. in the first screw area, 255° C. in the second screw area, 260° C. in the third screw area and 270° C. at die orifice; diameter of the die orifice was set to 3 mm. The extruded columnar transparent material was sheared to prepare transparent resin aggregates of 2-4 mm in length by adjusting shearing rate. The aggregates were then sealed and preserved in bilayer PE plastic bags.

Membrane Extrusion by Melting Extrusion:

The die orifice of the melting extrusion equipment was changed to film extrusion die head, while temperatures of the screw areas were set ditto. The transparent aggregates obtained were prepared into films by melting extrusion, thickness of which can be regulated by adjusting width of the die orifice. The films obtained were 20-100 μm in thickness.

Conversion of Melting Extrusion Film:

Sulfonyl fluoride (—$SO_2F$) pendant groups of the film were converted into the form of sulfonic acid ion (—$SO_3H$). The obtained films sequentially went through 30 wt. % sodium hydroxide solution at 80° C., 30 wt. % sulfuric acid solution ($H_2SO_4$) at 30° C., and washing trough filled by running deionized water, wherein the film stayed in alkali solution for 30 minutes and sulfuric acid solution for 10 minutes and washed with deionized water in the deionized water trough for 10 minutes. The membrane materials were wrapped up, sealed and preserved to obtain membrane products. The ion exchange membranes prepared from the perfluorinated ion exchange resins obtained in examples 1-6 were signed as Membrane 1-Membrane 6 respectively.

Evaluation on mechanical properties of membrane: Method GB/T1040-92 was adopted in the evaluation. Mechanical properties of Membrane 1-Membrane 6 prepared from the perfluorinated ion exchange resins obtained in examples 1-6 as well as sulfonic acid membrane NRE211 produced by DuPont were determined. The results are shown in Table 1.

TABLE 1

| Samples | Properties | | | |
| --- | --- | --- | --- | --- |
| | Ion Exchange Capacity (IEC) (mmol/g) | Heat-resistance Temperature (° C.) | Tensile Strength (MPa) | Breaking Elongation Rate (%) |
| Membrane of Example 1 | 1.77 | 320 | 30.2 | 161 |
| Membrane of Example 2 | 1.53 | 320 | 31.6 | 171 |
| Membrane of Example 3 | 1.34 | 320 | 32.3 | 175 |
| Membrane of Example 4 | 1.54 | 320 | 31.7 | 161 |
| Membrane of Example 5 | 1.44 | 320 | 30.6 | 179 |
| Membrane of Example 6 | 1.27 | 320 | 32.5 | 165 |
| NRE 211 from DuPont | 0.96-1.03 | 280 | 27 | 250 |

The data shown in Table 1 suggest that the membrane products prepared from the resins of the present invention have higher molecular weight, higher chemical stability, higher heat-resistance temperature, higher ion exchange capacity and better mechanical properties at high temperature in comparison with the prior arts.

Examples 8

A 1.0 L reaction vessel was cleaned and charged with 500 ml of deionized water and 10 g of sodium lauryl benzenesulfate and 13 g of nonylphenol polyoxyethylene ether NP-10 as emulsifiers followed by starting stirring device. The vessel was evacuated and then swept with high purity nitrogen for three times. After the measured oxygen content of the vessel was lower than 1 ppm, the vessel was evacuated again and charged with 50 g of sulfonyl fluoride pendant group-containing vinyl ether monomer (1) ($F_2C$=$CF$—$O$—$CF_2$—$CF_2$—$SO_2F$), 60 g of sulfonyl fluoride pendant group-containing vinyl ether monomer (2) ($F_2C$=$CF$—$O$—$CF_2$—$CF_2$—$CF_2CF_2$—$SO_2F$) and 40 g of bromine pendant group-containing vinyl ether monomer ($F_2C$=$CF$—$O$—$CF_2CF_2$—$Br$) via liquid feeding inlet valve. To the reaction vessel was charged tetrafluoroethylene monomer until the pressure reached 3.9 MPa. The reaction vessel was heated to 80° C., charged with 5.2 of ammonium persulfate as initiator. Polymerazation were conducted while maintaining the pressure at 3.2 MPa and then stopped after 2 hours followed by demulsification to obtain white polymer powder. After washing and drying, the white polymer powder was dissolved in solvent DMF to prepare 10 mg/ml solution. The results of GPC testing on the solution showed that number-average molecular weight is 225 thousands, weight-average molecular weight is 360 thousands. No abnormal vibration absorption peaks were shown in the results of infrared radiation testing.

Polymerization was conducted under the same conditions set ditto but the only condition changed was that 145 g of sulfonyl fluoride pendant group-containing vinyl ether monomer (1) ($F_2C$=$CF$—$O$—$CF_2$—$CF_2$—$SO_2F$) was charged into the vessel via liquid feeding inlet valve, which ensure that total concentration of double bonds in the system was consistent with the above. The obtained polymer powder was dissolved and examined by GPC testing. The results showed that number-average molecular weight is 123 thousands, weight-average molecular weight is 205 thousands. The results of infrared radiation testing showed that antisymmetric stretching vibration absorption peak of single bond —S—O—C— appeared at 830 $cm^{-1}$.

These results suggested that cyclization did occur on short pendant groups during polymerization when utilizing only one kind of sulfonyl fluoride pendant group-containing vinyl ether monomer (1). The present invention utilizes two kinds of sulfonyl fluoride pendant group-containing vinyl ether monomers (1) and (2) as well as other vinyl ether monomers which may interact with each other and cyclization is therefore decreased or eliminated.

The invention claimed is:

1. A perfluorinated resin, prepared by multivariate copolymerization of tetrafluoroethylene, two kinds of sulfonyl fluoride-containing vinyl ether monomers of different structures, and bromine pendant group-containing vinyl ether monomer; said resin comprises repeating units as shown in formula (I):

-continued wherein n is an integer between 0 to 3; m is an integer between 2 to 4; a, b and c are each independently an integer between 3 and 15, while a', b' and c' are each independently an integer between 1 and 3; $x/(x+y+z)=0.2-0.7$, $y/(x+y+z)=0.2-0.79$, $z/(x+y+z)=0.01-0.1$.

2. The perfluorinated resin according to claim 1, wherein said two kinds of sulfonyl fluoride-containing vinyl ether monomers of different structures have formulas:

(1)

(2)

said bromine pendant group-containing vinyl ether monomer has formula:

wherein n=0-3; m is an integer between 2-4.

3. The perfluorinated resin according to claim 2, wherein the molar ratio between the sulfonyl fluoride-containing vinyl ether monomers of structure (1) and the sulfonyl fluoride-containing vinyl ether monomers of structure (2) is 0.2-0.8: 0.8-0.2.

4. The perfluorinated resin according to claim 3, wherein the molar ratio between the sulfonyl fluoride-containing vinyl ether monomers of structure (1) and the sulfonyl fluoride-containing vinyl ether monomers of structure (2) is 0.4-0.6: 0.6-0.4.

5. The perfluorinated resin according to claim 2, wherein n=0.

6. The perfluorinated resin according to claim 1, wherein molar percent of each polymerization monomer in said polymer are: the total molar percent of tetrafluoroethylene is 50-85%; the total molar percent of said two kinds of sulfonyl fluoride-containing vinyl ether monomers of different structures is 5-49%, and the total molar percent of bromine pendant group-containing vinyl ether polymerization monomer is 1-5%.

7. The perfluorinated resin according to claim 6, wherein the molar percent of each polymerization monomer in said polymer are: the total molar percent of tetrafluoroethylene is 70-80%; the total molar percent of said two kinds of sulfonyl fluoride-containing vinyl ether monomers of different structures is 15-29%, and the total molar percent of the bromine pendant group-containing vinyl ether monomer is 1-5%.

8. The perfluorinated resin according to claim 1, wherein n=0.

9. A preparation method of the perfluorinated resin according to claim 1, comprising subjecting tetrafluoroethylene, two kinds of sulfonyl fluoride-containing vinyl ether monomers of different structures, and a bromine pendant group-containing vinyl ether monomer in the presence of initiator to copolymerization.

10. The preparation method according to claim 9, wherein said initiator is one or more selected from the group of $N_2F_2$, perfluoroalkyl peroxide and persulfate.

11. The preparation method according to claim 10, wherein said perfluoroalkyl peroxide is one or more selected from the group of perfluoroalkylacyl peroxide, perfluoroalkoxyacyl peroxide, peroxide where the peroxidated portion contains fluoroalkylacyl and peroxide where the peroxidated portion contains fluoroalkoxyacyl; and said persulfate is one or more selected from the group of ammonium sulfate, alkali metal persulfide and alkaline earth metal persulfide.

12. The preparation method according to claim 11, wherein said perfluoroalkyl peroxide is one or more selected from the group of perfluoropropionyl peroxide, 3-chlorofluoropropionyl peroxide, perfluoromethoxy acetyl peroxide, ω-H-perfluorobutanoyl peroxide, ω-$SO_2$F-perfluoro-2,5,8-trimethyl-3,6,9-trioza-undecyl peroxide, $CF_3CF_2CF_2CO$—OO—$COCF_2CF_2CF_3$, $CF_3CF_2CF_2OCFCF_3CO$—OO—$COCFCF_3OCF_2CF_2CF_3$, $CF_3CF_2CH_2CO$—OO—$COCH_2CF_2CF_3$ and $CF_3OCF_2CF_2CO$—OO—$COCF_2CF_2OCF_3$; and said persulfate is one or more selected from the group of ammonium persulfate and potassium persulfate.

13. The preparation method according to claim 9, wherein said preparation method further comprises a step of emulsion polymerization conducted in water phase.

14. The preparation method according to claim 13, wherein, in the step of emulsion polymerization, emulsifier is one or more selected from anionic emulsifier and non-ionic emulsifier.

15. The preparation method according to claim 14, wherein, in the step of emulsion polymerization, weight percentage concentration of emulsifier in water is 0.1-20%, weight percentage concentration of the two kinds of sulfonyl fluoride-containing vinyl ether monomers of different structures in water is 5-30%, and weight percentage concentration of the bromine pendant group-containing vinyl ether monomer is 1-12%.

16. The preparation method according to claim 14, wherein, the anionic emulsifier is one or more selected from sodium aliphatate, sodium lauryl sulfate, sodium alkylsulfonate and sodium alkylarylsulfonate; the non-ionic emulsifier is one or more selected from alkylphenol polyetherols, nonylphenol polyoxyethylene ether, polyoxyethylene fatty acid, and polyoxyethylene fatty acid ether.

17. The preparation method according to claim 9, wherein reaction time of said copolymerization is 1-8 hours, reaction temperature is 10-80° C. and reaction pressure is 2-10 MPa.

18. An ion exchange membrane prepared from the perfluorinated resin according to claim 1.

19. A fuel cell or electrolytic cell device comprising the ion exchange membrane according to claim 18.

20. The fuel cell or electrolytic cell device according to claim 19, wherein said fuel cell is proton membrane fuel cell; and said electrolytic cell is chlor-alkali electrolytic cell.

* * * * *